(12) United States Patent
Gagne

(10) Patent No.: US 6,968,347 B2
(45) Date of Patent: Nov. 22, 2005

(54) DATA RECOVERY METHOD AND APPARATUS

(75) Inventor: Mathieu Gagne, Boston, MA (US)

(73) Assignee: EMC Corporation, Hopkinton, MA (US)

(*) Notice: Subject to any disclaimer, the term of this patent is extended or adjusted under 35 U.S.C. 154(b) by 317 days.

(21) Appl. No.: 09/796,078

(22) Filed: Feb. 28, 2001

(65) Prior Publication Data
US 2002/0120605 A1 Aug. 29, 2002

(51) Int. Cl.[7] .............................................. G06F 17/30
(52) U.S. Cl. ...................... 707/202; 707/10; 707/204
(58) Field of Search .................... 707/10, 202, 204; 711/114; 714/6

(56) References Cited

U.S. PATENT DOCUMENTS

| | | | | |
|---|---|---|---|---|
| 5,781,910 A | * | 7/1998 | Gostanian et al. ......... 707/201 |
| 6,243,715 B1 | * | 6/2001 | Bogantz et al. .............. 707/201 |
| 6,421,686 B1 | * | 7/2002 | Martin, Jr. .................. 707/201 |
| 6,553,390 B1 | * | 4/2003 | Gross et al. ................. 707/202 |
| 6,571,324 B1 | * | 5/2003 | Elkington et al. .......... 711/162 |
| 2002/0103816 A1 | * | 8/2002 | Ganesh et al. | |
| 2002/0120637 A1 | * | 8/2002 | Parham et al. .............. 707/201 |
| 2002/0184524 A1 | * | 12/2002 | Steele et al. ................. 713/201 |

* cited by examiner

*Primary Examiner*—Greta Robinson
*Assistant Examiner*—Sathyanarayan Pannala
(74) *Attorney, Agent, or Firm*—George A. Herbster

(57) ABSTRACT

A method and apparatus for data recovery in a system involving a first data store acting as a standard volume and a physical moving mirror data store that operates in a first mode to be synchronized and in a second, isolated mode. A third physical mirror data store synchronizes with the second data store in its second operating mode. In response to a command to establish a third or reverse split operating mode, the data to be transferred in response to that command is identified. Copying of the identified data then commences from the third data store to the second data store to recover any data that may have been corrupted in the second data store.

18 Claims, 4 Drawing Sheets

DATA RECOVERY METHOD AND APPARATUS

BACKGROUND OF THE INVENTION

1. Field of the Invention

This invention generally relates to the maintenance of data redundancy in data storage facilities and more particularly to recovering data in such a facility.

2. Description of Related Art

Many data processing applications now operate on digital data processing systems that incorporate large scale memory facilities. These large scale memories take many forms. One such form is a disk array storage device (DASD) in which data is stored at a local large scale disk memory with many physical disk drives. In other applications it may be desired to distribute the functions of equivalent devices over a network at different network nodes.

When maintaining data integrity is critical, such large scale disk memories include some type of data redundancy. Memory mirrors provide on-site redundancy to protect against equipment failure. U.S. Pat. No. 5,206,939 to Yanai et al. and assigned to the same assignee as this invention discloses a remote system that normally acts as a mirror of a local system. The geographical separation between the local and remote systems provides an extremely high degree of reliability, particularly as protection against a natural disaster.

More recently U.S. Pat. No. 6,101,497 granted Aug. 8, 2000 discloses a tool that is particularly well adapted for facilitating redundancy. This device, called a BCV device, establishes a special physical disk structure that acts as a moving mirror to attach to and to synchronize with a standard or production volume or device without interfering with normal operations between an application program being run by a host. Once this BCV moving mirror is synchronized with the standard volume, it can be split, or isolated from the standard volume and thereafter be available for backup or for use by another application.

As known, data on a standard volume can, for a variety of reasons, become corrupt. As described in the foregoing U.S. Pat. No. 6,101,497, a restore or an incremental restore command initiates a process by which data in the redundant BCV physical mirror is replicated to the standard or production volume, assuming that data on the BCV physical mirror has not been changed as, for example, if the BCV physical mirror when isolated, is a source for a tape backup. The data on the BCV physical mirror represents the data that existed when the standard volume and the BCV physical mirror were isolated from each other. However, many databases and other applications maintain a log file, or like file that records each transfer and the sequence of each transfer. Entries from such a file from a point in time after the prior isolation can be used to recover the data fully on the standard volume. This process is known as "unrolling the redo logs".

During this process, the BCV device is attached to the standard volume. Consequently, as each log entry is processed, a resultant write operation transfers the data associated with that log entry to both the standard volume and the BCV physical mirror. Consequently, after the first write operation occurs, the data on the BCV physical mirror is no longer identical to the data that had been on the BCV physical mirror at the time of a prior split. Oftentimes errors can occur corrupting the data on the standard volume and, due to the mirroring function, the data on the BCV physical mirror. When this occurs it may be required to recover data from a tape backup made even earlier in time and again try to reconstruct the current data by unrolling the redo logs for a longer time interval. Data recovery involving tape backups can be time consuming and tedious.

SUMMARY

Therefore it is an object of this invention to improve a facility for recovering data from a redundancy device.

Still another object of this invention is to provide a facility for improving data recovery involving specially configured volumes that can interact with multiple applications.

This invention facilitates the recovery of data that is stored redundantly on a first data store as a standard volume for storing a primary copy of the data. A second data store is defined to act as a moving mirror. The second data store operates in a first mode as a mirror to the first data store and operates in a second mode by being detached from the first data store. A third data store synchronizes with the second data store in its second operating mode. Recovery is obtained by issuing a command to establish a third operating mode for the second data store wherein the data in the second data store is replaced with data from the third data store. This process includes identifying the data to be transferred in response to the command and thereafter copying the identified data from the third data store to the second data store.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
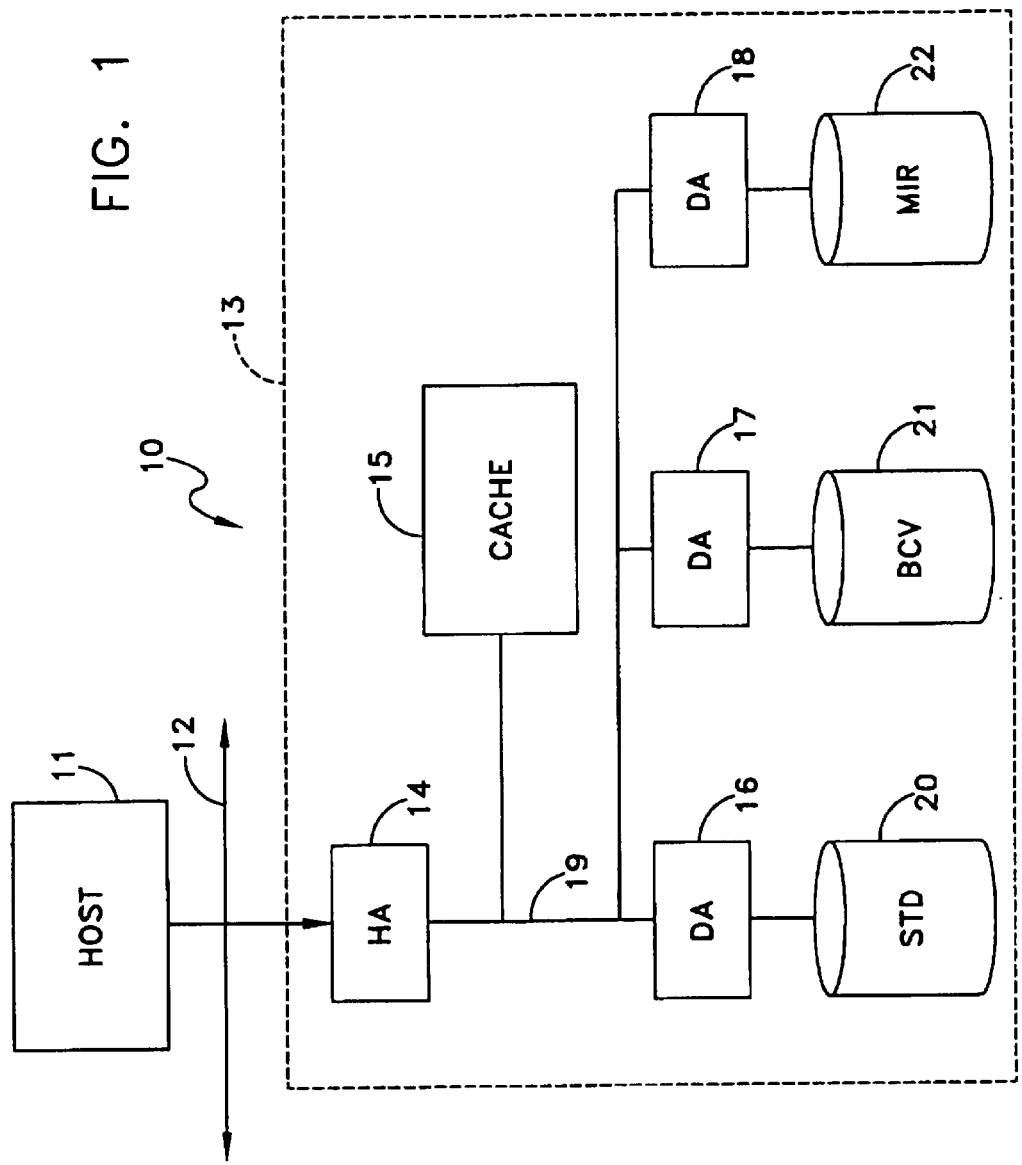
FIG. 1 is a block diagram of a specific embodiment of a data processing system that can implement this invention.

FIG. 1 depicts one example of a data processing system or network that can implement this invention. In this particular embodiment the configuration is that of a data processing system 10 with a host 11. Additional hosts can connect in parallel with the host 11 over a bus structure 12. A data storage facility 13 connects over the bus structure 12 to the host 11. In this particular embodiment the data storage facility 13 is a local facility that includes all the data stores. As will become apparent, this invention can be applied to other configurations in which certain data stores are located in a geographically remote location or in which individual data stores or portions of data stores are distributed throughout a local- or wide-area network.

FIG. 1 defines this invention in terms of a SYMMETRIX® data storage facility manufactured and sold by the assignee of this invention. In such a data storage facility 13, a host adapter (HA) 14, that includes a microprocessor control, communicates with the host 11 and other hosts on the bus structure 12.

As known, the hosts run application programs, or applications. The applications generate data transfer requests including read and write requests to transfer data from or transfer data to the data storage facility 13. The host adapter 14 acts as an interface between such hosts and the bus structures 12 and the remainder of the data storage facility, particularly a cache 15 and disk adapters 16, 17 and 18 over a bus structure 19. The data storage facility 13 may include additional device adapters.

Each device adapter connects to at least one physical disk drive. Physical disk drives store data on tracks grouped as logical volumes. A logical volume may include a subset of contiguous tracks on a physical disk drive, a full set of tracks in an entire physical disk drive or even tracks on multiple disk drives. The following discussion defines the invention in terms of volumes or devices. In this particular embodiment and for purposes of explanation, the disk adapter 16 controls a standard volume, stored on an STD physical mirror 20; the disk adapters 17 and 18 control a BCV physical mirror 21 and an MIR physical mirror 22, respectively.

The data storage facility 13 shown in FIG. 1 is configured to operate with the host 11 interacting with two devices, namely a standard device and a backup device. The standard device comprises the STD physical mirror 20 that stores a primary copy of data and, in a first operation mode, the BCV physical mirror 21. The BCV physical mirror 21 is, as described in U.S. Pat. No. 6,101,497, a data store operable in one mode as a mirror to the first data store. For example, U.S. Pat. No. 6,101,497 discloses an ESTABLISH command generated by an application program in the host 11 or elsewhere in the system to cause the BCV physical mirror 21 to attach to and synchronize with the STD physical mirror 20 so they act as a standard or production device.

The MIR physical mirror 22 acts as a third data store that synchronizes with the second data store, or BCV physical mirror in another operating mode to constitute the backup device. This second operating mode can have several variations and generally is referred to as a split mode. U.S. Pat. No. 6,101,497 defines a full split operation in which the BCV physical mirror 21 detaches from the STD physical mirror 20 and copies all the data to a mirror such as the MIR physical mirror 22. U.S. patent application Ser. No. 09/251,812 describes a second variation that operates in response to a differential split command in which only information that has been altered on the standard STD physical mirror 20 transfers from the BCV physical mirror 21 to the MIR physical mirror 22. U.S. patent application Ser. No. 09/303,242 describes a third variation of a command whereby all the data can transfer without a delay for processing any pending write operations in the cache 15. Under any of the foregoing variations, the standard device is constituted by the STD physical mirror 20; the backup device, by the attached BCV and MIR physical mirrors 21 and 22.

Figure 2:
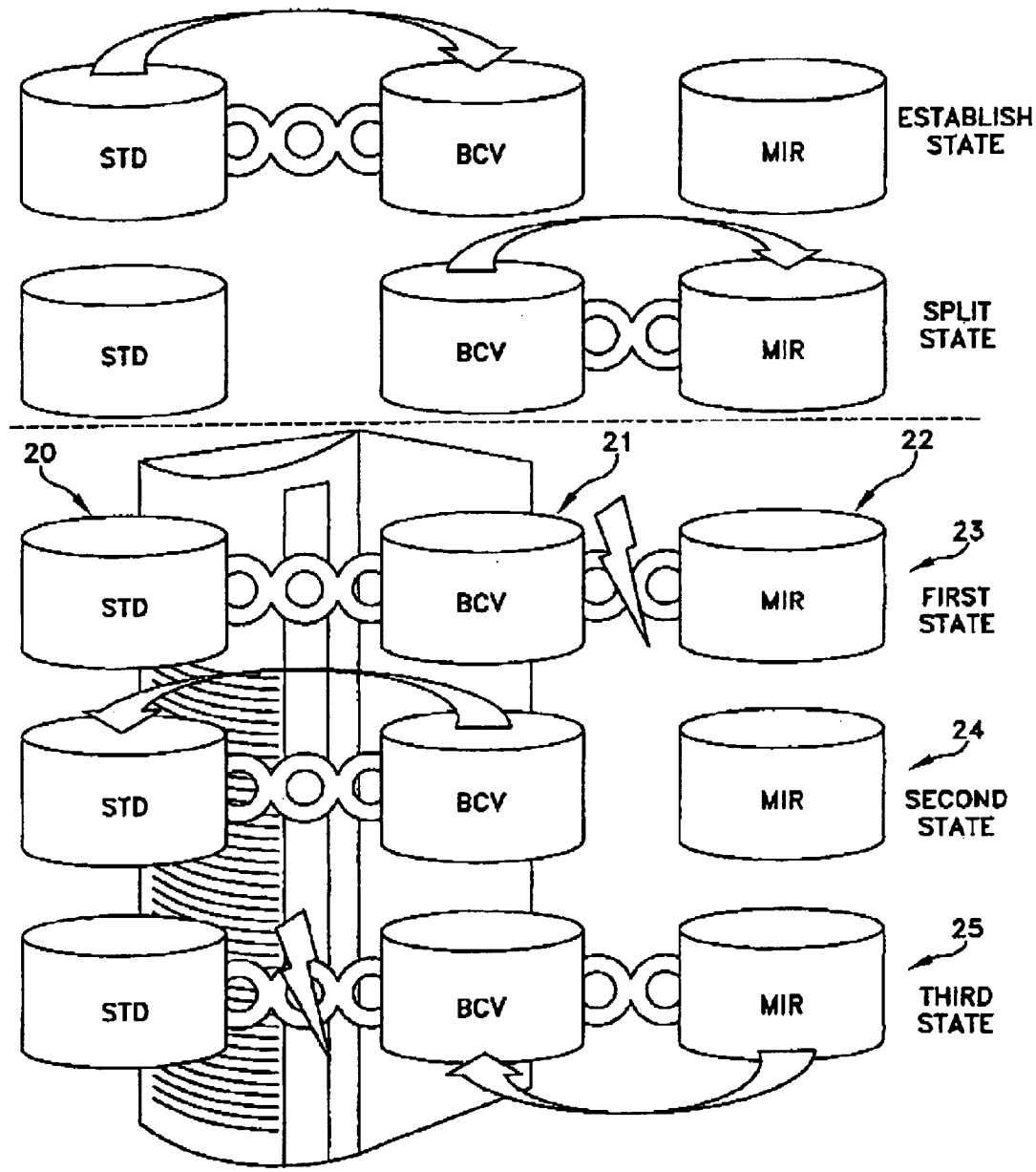
FIG. 2 is a pictorial diagram that is useful in understanding the basic operations of this invention.

FIG. 2 schematically depicts the STD, BCV and MIR physical mirrors 20, 21 and 22 in different states. Reference numeral 23 refers to a first state that exists after it is determined that data in the STD physical mirror 20 has become corrupted. The BCV and MIR physical mirrors 21 and 22, after reaching synchronization while operating as the backup device, are detached; and the BCV physical mirror 21 attaches to the STD physical mirror 20. This is the initial step of a restore operation as defined in U.S. Pat. No. 6,101,497. After the restore operation is complete at state 23, the data in the STD physical mirror 20 corresponds to the data as it existed at a prior time, as when a last split operation occurred with respect to the BCV physical mirror 21. It is therefore necessary to use logs or other means and methods to make the STD physical mirror 20 current.

Reference numeral 24 depicts the operation of unrolling the redo logs or taking other steps and refers to a second state. During this process the STD and BCV physical mirrors 20 and 21 define the standard device. Data written to the STD physical mirror 20 will also be written to the BCV physical mirror 21. As will be apparent, when the first write operation occurs, the data in the BCV physical mirror 21 no longer replicates the data in the MIR physical mirror 22. If some error occurs during this process while the STD and BCV physical mirrors constitute the standard device, there is no longer a valid data copy for a restore operation in the BCV physical mirror 21.

In accordance with this operation then, a third state is entered as identified by reference numeral 25. The BCV physical mirror 21 detaches from the STD physical mirror 20 and attaches to the MIR physical mirror 25 in a reverse split operation to become part of the backup device. During this operation, data on the BCV physical mirror 21 is brought into synchronism with the data on the MIR physical volume 22, rather than the opposite operation. When this operation completes, the data in the BCV physical mirror 21 replicates the data in the MIR physical mirror 25, so another restore operation as identified by reference numeral 23 can occur.

Figure 3:
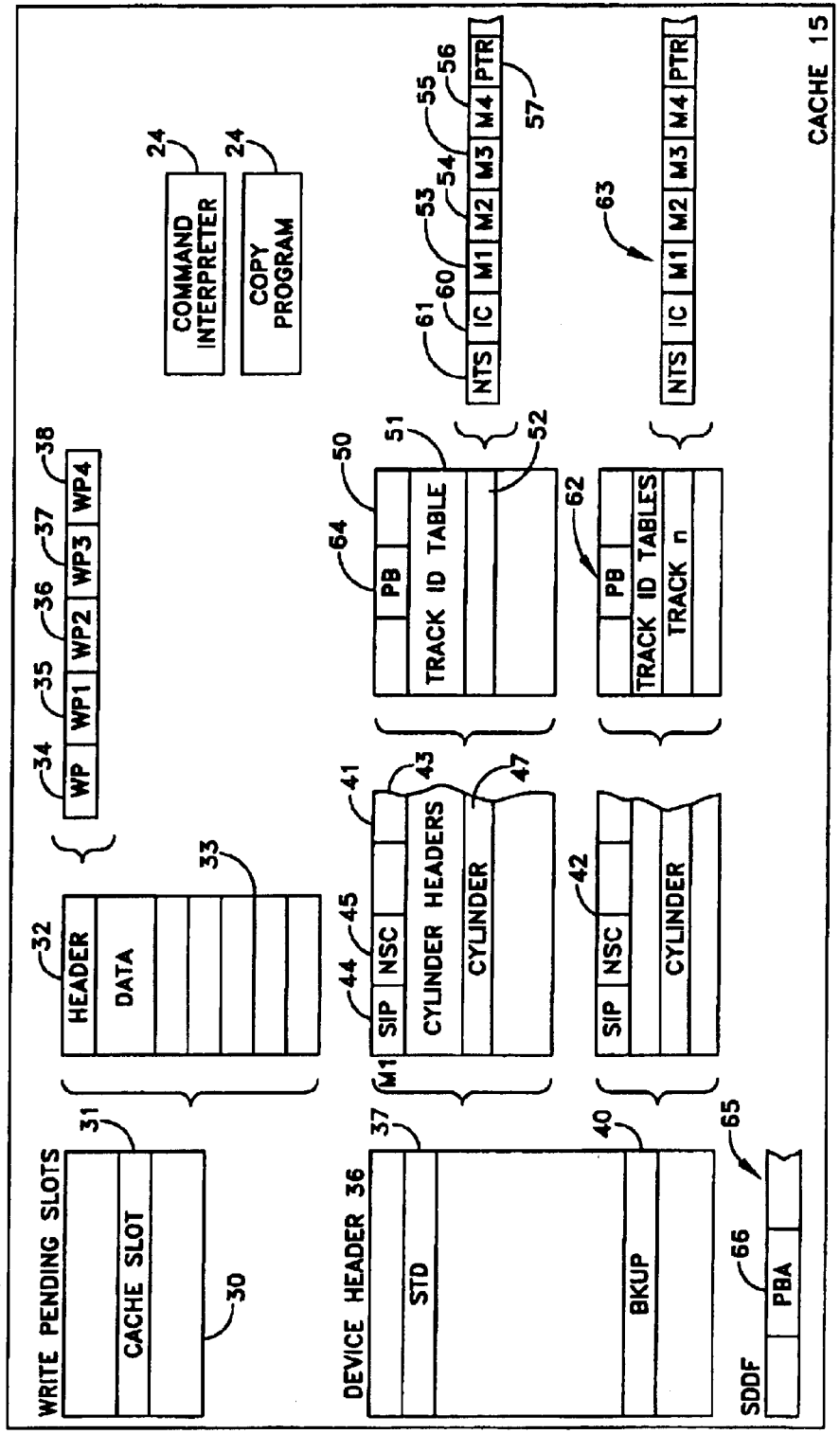
FIG. 3 depicts the organization of those parts of the cache in FIG. 1 that are relevant to this invention.

Before describing a reverse split operation in accordance with this invention in detail, it will be helpful to review the organization of the cache 15 shown in FIG. 1. Referring to FIG. 3, the cache 15 includes a command interpreter 24. The command interpreter will contain the necessary programming that enables various operation in response to commands related to the BCV physical mirror 21 including a reverse split command.

The cache 15 also includes write pending slots 30 with a particular cache slot 31 being shown in detail. Each cache slot includes a header 32 and data 33 to be written. The header 32 includes a WP flag 34 that is set when any of its WP1 through WP4 flags 35 through 38 is set. As known, the WP1 through WP4 flags in the header denote each mirror for a device and indicate whether a write pending is associated with any of the corresponding physical mirrors M1 through M4, respectively for that device. The BCV feature requires that flags associated with a fourth mirror, M4, be available for operations, so only three physical mirrors can be attached to a host. In the embodiment shown in FIG. 1, the host adapter 14 would set appropriate ones of the WP1 through WP3 flags 34 through 36 in FIG. 3 to indicate the existence of a write request to all the mirrors of the standard device.

An asynchronously operating destaging process identifies a write pending cache slot and a WP flag, such as the WP1 flag 35 and transfers the data from the data buffer 33 to a corresponding physical mirror and then clears the WP1 flag 35. When a subsequent destaging process clears any of WP flags 35 through 38 and all these flags are cleared, the destaging process clears the WP flag 34. When this occurs, it is possible to release the cache slot, such as the cache slot 31.

Device headers 36 includes a device header for each device. In the context of the system shown in FIG. 1, an STD header 37 is associated with the standard device that includes the STD physical mirror 20 and, when attached, the BCV physical mirror 21. Device headers 36 contain other entries, such as a BKUP header 40 for a backup device that includes the MIR physical mirror 22 and, when attached, the BCV physical mirror 21. Each of these headers identifies the cylinders associated with its corresponding device. Cylinder blocks, such as a cylinder block 41 for the STD device and a cylinder block 42 associated with the BKUP device, have similar structures.

Initial entries in the device header 36, include certain flags relevant to one or more of the full, instant and differential split operations including a split in progress (SIP) bit 44 and a next split cylinder (NSC) field 45. The cylinder block 41 also contains a list of all the cylinders associated with the standard device, such as a cylinder entry 47. Each cylinder entry has the same format; the cylinder entry 47 is specifically shown and comprises a header 50 and a Track ID Table 51 for each track in the cylinder. Each track entry, such as a track entry 52, includes information, such as M1 through M4 mirror bits 53 through 56 and a pointer (PTR) 57 to a cache slot. An In-Cache (IC) flag 60 indicates whether the data for that track is in the cache slot 31. Each track entry additionally includes a Need-To-Split Me (NTS) flag 61 useful in an instant split operation. A track entry 63 has the same structure as the track entry 52.

Each header in a cylinder entry, such as header 50 includes a PB field 64 with a bit assigned to each track in a particular cylinder. As specifically implemented, the PB field 64 is one of several like sections that can be assigned to specific functions. Each PB bit is set whenever a change is made to a track in the logical volume. In an actual system there are multiple and assignable protection bit fields. An SDDF or similar register 65 includes a PBA field 66 that identifies which PB field is associated with the ESTABLISH and SPLIT operations. A selected PB table identifies each change made to a track in the STD physical mirror 20 since the processing of a prior instant or differential split operation.

FIG. 3 also depicts a copy program 67. The copy program 67 runs asynchronously in response to specific arguments. Two arguments identify the source and destination for the copy operation. A third argument identifies a specific location in the source track identification table that lists each track to be copied.

Figure 4:
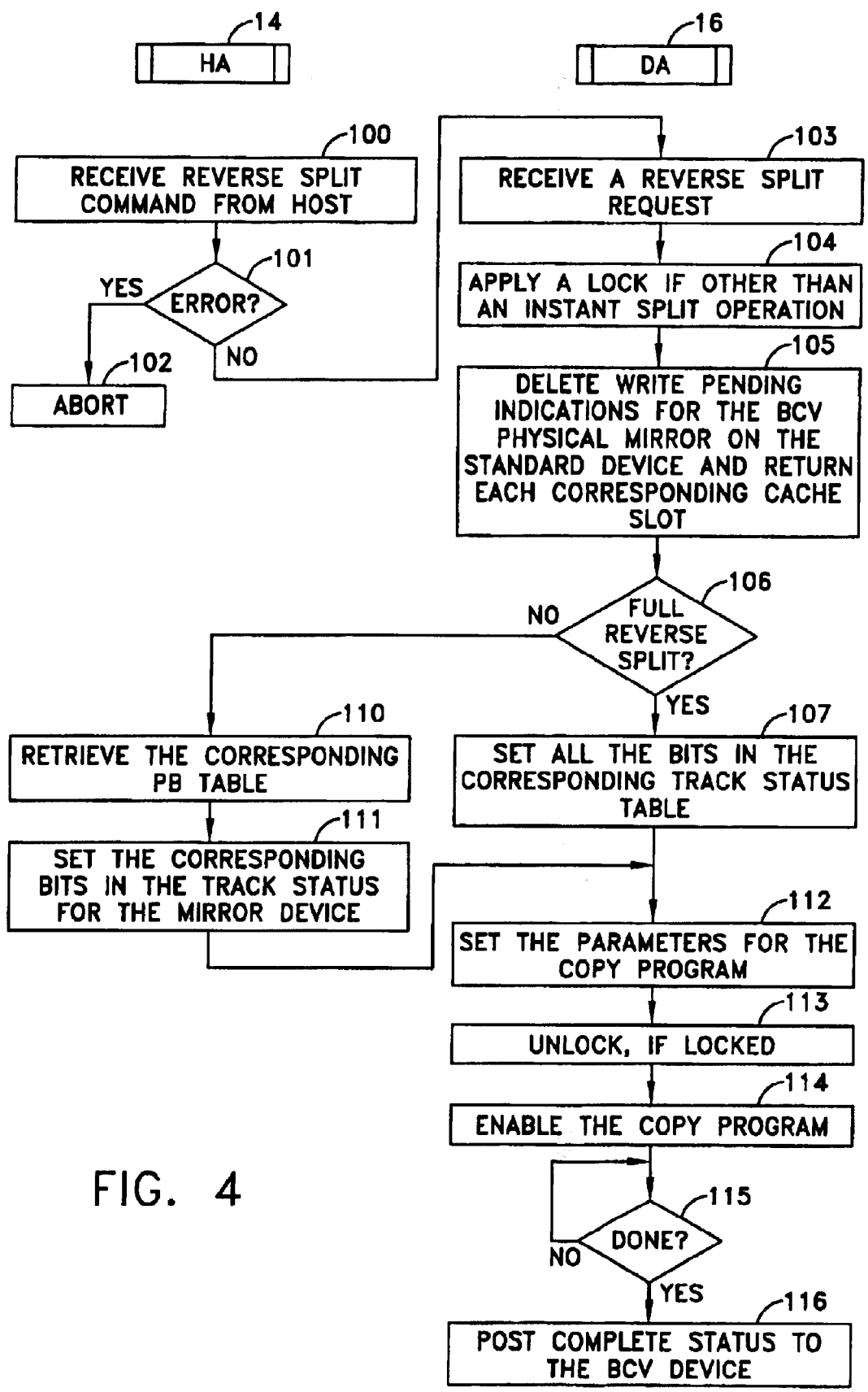
FIG. 4 is a flow diagram of a specific method for implementing this invention.

FIG. 4 depicts the operation of a host adapter, such as the host adapter 14 in FIG. 1 and the disk adapters, specifically the disk adapter 16 associated with the BCV physical mirror 21 that is used in this specific embodiment. As previously indicated, the reverse split command has several variations, so the host adapter 14 receives a command that identifies a variation of the reverse split command from the host in step 100. If a syntax, context or other error exists, step 101 transfers control to an abort procedure 102 as known in the art. If there is no error, the host adapter 14 transfers the command onto the bus structure 19.

When the disk adapter 16 receives a reverse split command in step 103, it detaches or moves the BCV physical mirror 21 from the standard volume 20 as shown in state 25 in FIG. 3. If the reverse split command is other than an instant split command, step 104 applies a lock to prevent any further interaction with the data in any of the physical mirrors, such as the STD physical mirror 20, by any application program.

Step 105 handles any write pending operations as identified in the various headers for the different slots shown in FIG. 3. For any reverse split variation, the write pending operations for the BCV physical mirror 21 as a component of the standard device are removed. For example, assume that the M1 and M2 bit positions in track identification table 51 of FIG. 3 were assigned to the STD physical mirror 20 and to the BCV physical mirror 21. Step 105 clears all the WP2 bits in the associated header 32 of the write pending slots 30. During this process any write pending operations involving the STD physical mirror 20 are disregarded. No write pendings can exist with respect to the MIR physical mirror 22.

After write pending information is handled, step 106 determines the split variation. If a full reverse split is being processed, step 106 transfers to step 107 to set all the M1 bits in the corresponding track identification table 62 associated with the backup device so that all the data in the MIR physical mirror 22 will transfer to the BCV physical mirror 21. In the case of an instant split or differential split, control transfers to step 110. As previously indicated, the PB bit table indicates changes that have occurred to the standard volume and changes to the BCV physical mirror 21 that might have occurred prior to the discovery of an error during a restore operation. Step 111 uses the information in the PB table to identify those tracks that need to be updated and transfers that information into the track status table for the BCV physical mirror, such as the M1 bit position for the track identification table 62.

Thus, in the case of a full reverse split all the tracks in the BCV physical mirror 21 will be altered; in the case of a reverse instant split or reverse differential split, only data in tracks corresponding to the changed tracks identified by the PB table will be updated from the MIR physical mirror 22.

Step 112 then sets the parameters for a copy program 24. Conventionally the copy program 24 has transferred data from a BCV physical mirror to another physical mirror, such as the MIR physical mirror 22. In accordance with this invention step 112 establishes the MIR physical mirror 22 as a source and the BCV physical mirror 21 as a destination. The M1 bits in the track identification table 51 control the tracks that are transferred by the copy program 24.

In step 113 any lock applied by step 104 is released. Step 114 then enables the copy program to begin the transfer in accordance with the parameters established in step 112. This operation continues until step 115 determines that the BCV physical mirror 21 is synchronized with the MIR physical mirror 22. Step 116 then posts a complete status that a host adapter will handle in an appropriate manner.

Thus, when the reverse split operation occurs, the BCV physical mirror 21 is in synchronism with the data in the MIR physical mirror 22 so the data in the BCV physical mirror 21 reverts to the state that existed at the time of the prior split operation. This enables an operator to initiate a restore operation and undertake further data recovery without fear of corrupting the data to a level that would require recovery from a tape or other more permanent backup that might be even earlier in time than the data stored in the BCV physical mirror 21. Thus in accordance with the objects of this invention, the implementation of a reverse split operation adds to the armamentarium of commands available to overcome problems that can occur during data recovery operations.

There are many variations that can be made to the specifically disclosed embodiment shown in FIGS. 1 through 4. FIGS. 3 and 4 for example, depict a specific organization of tables and modules associated with a specific data storage facility in which a host produces a reverse split command. Different configurations of the information could be substituted without detracting from the overall operation of the system. Also, it will be apparent that the broad functionality of the invention can be applied to many diverse local, remote and network-based systems including local hosts, servers and applications. This invention is described in conjunction with a single STD physical mirror 20 and with a BCV physical mirror 21 as a moving mirror that can define each of two devices. Generally a device will include multiple logical devices, each of which could be organized in the same way by replicating the operation and apparatus shown in FIGS. 1 through 4. In other applications the single STD physical mirror 20 could also operate with a fixed mirror in addition to the moving mirror constituted by the BCV physical mirror 21. Moreover, the description of the reverse split operation establishes a specific sequence of events for purposes of explanation. Other sequences might also be included with the elimination of some or addition of other operations depending upon a specific implementation. Such sequences can be under manual control so that each transfer between operating modes will be initiated by a system operator. Alternatively, all or portions of such operations might be under automatic control for different sources. Thus, while this invention has been disclosed in terms of certain embodiments, it is the intent of the appended claims to cover all such variations and modifications as come within the true spirit and scope of this invention.

What is claimed as new and desired to be secured by Letters Patent of the United States is:

1. A method for facilitating the recovery of data that is stored redundantly wherein a first data store acts as a standard physical mirror for storing a primary copy of the date for interaction with a host, said method comprising the steps of:
   A) defining a second data store operable in a first mode to receive data from the first data store thereby to act as a mirror to the first data store and operable in a second mode wherein the first and second data stores are detached while the host continues to interact with the first data store,
   B) defining a third data store that receives data from the second data store thereby to synchronize the third data store to the second data store to mirror the second data store in said second mode while the host continues to interact with the first data store,
   C) issuing a command to establish a third mode for the second data store wherein data in the second data store is replaced with data from the third data store while the second data store is detached from the first data store,
   D) identifying the data to be transferred in response to the command, and
   E) copying the identified data from the third data store to the second data store in response to the issuance of the command and identification of data thereby to restore the second data store to a state that existed at the time of a prior transfer of the second data store from the first mode to the second mode.

2. A method as recited in claim 1 wherein the second operating mode is characterized by a plurality of variations, said third operating mode identifying a specific variation and said data identification being responsive to the specific variation.

3. A method as recited in claim 2 wherein one of the operating mode variations is a full transfer variation for copying all of the data from the standard volume to the second data store, said data identification identifying all of the data in the third data store in response to the existence of the full transfer variation.

4. A method as recited in claim 3 wherein each of the data stores receives data from a cache memory and wherein, at a time of a change in an operating mode data exists in the cache memory that has not been transferred to one of the data stores, said method additionally comprising the steps of eliminating references to the transfers in the second data store and disregarding references to the transfers in the first data store.

5. A method as recited in claim 2 wherein one of the operating mode variations is a partial transfer variation for copying portions of the data from the standard volume to the second data store, said data identification identifying corresponding portions of the data in the third data store in response to the existence of partial transfer variation.

6. A method as recited in claim 5 wherein each of the data stores organizes the data in data tracks and each data store has a track identification table and said first data store has a second table that records changes to data therein, said partial transfer variation additionally including the step of transferring the contents of the second table to the track identification table for the second data store, said copying being limited to the transfer of the data in the corresponding tracks.

7. A method as recited in claim 6 wherein each of the data stores receives data from a cache memory and wherein, at a time of a change in an operating mode data exists in the cache memory that has not been transferred to one of the data stores, said method additionally comprising the steps of eliminating references to the transfers in the second data store and disregarding references to the transfers in the first data store.

8. A method as recited in claim 5 wherein each of the data stores receives data from a cache memory and wherein, at a time of a change in an operating mode data exists in the cache memory that has not been transferred to one of the data stores, said method additionally comprising the steps of eliminating references to the transfers in the second data store and disregarding references to the transfers in the first data store.

9. A method as recited in claim 2 wherein each of the data stores receives data from a cache memory and wherein, at a time of a change in an operating mode data exists in the cache memory that has not been transferred to one of the data stores, said method additionally comprising the steps of eliminating references to the transfers in the second data store and disregarding references to the transfers in the first data store.

10. Apparatus for facilitating the recovery of data that is stored redundantly wherein a first data store stores a primary copy of the data for interaction with a host, said apparatus comprising:
   A) a second data store operable in a first mode to receive data from the first data store thereby to act as a mirror to the first data store and operable in a second mode wherein the first and second data stores are detached and the host continues to interact with the first data store,
   B) a third data store that receives data from the second data store thereby to synchronize the third data store to the second data store to mirror the second data store in the second mode while the host continues to interact with the first data store,
   C) a command generator for issuing a command to establish a third mode for the second data store wherein data in the second data store is replaced with data from the third data store while the second data store is detached from the first data store,
   D) means for identifying the data to be transferred in response to the command, and
   E) a copy program for copying the identified data from the third data store to the second data store in response to the issuance of the command and identification of data thereby to restore the second data store to a state that existed at the time of a prior transfer of the second data store from the first mode to the second mode.

11. Apparatus as recited in claim 10 wherein the second operating mode is characterized by a plurality of variations, said third operating mode including means for identifying a specific variation and said data identification means being responsive to the specific variation.

12. Apparatus as recited in claim 11 wherein said variation identifying means responds to a command for a full transfer variation, said data identification means identifying all of the data in the third data store in response to the receipt of a full transfer variation command.

13. Apparatus as recited in claim 12 wherein each of the data stores receives data from a cache memory and wherein, at a time of a change in an operating mode data exist s in the cache memory that has not been transferred to one of the data stores arid wherein said apparatus additionally includes means for eliminating references to the transfers in the second data store and disregarding references to the transfers in the first data store.

14. Apparatus as recited in claim 11 wherein one of the operating mode variations is a partial transfer variation for copying portions of the data from the standard volume to the second data store, said data identification means identifying corresponding portions of the data in the third data store in response to the existence of partial transfer variation.

15. Apparatus as recited in claim 14 wherein each of the data stores organizes the data in data tracks and each data store has a track identification table and said first data store has a second table that records changes to data therein, said apparatus additionally comprising means for transferring the contents of the second table to the track identification table for the second data store, said copy program transferring data in the corresponding tracks.

16. Apparatus as recited in claim 15 wherein each of the data stores receives data from a cache memory and wherein, at a time of a change in an operating mode data exists in the cache memory that has not been transferred to one of the data stores and wherein said apparatus additionally includes means for eliminating references to the transfers in the second data store and disregarding references to the transfers in the first data store.

17. Apparatus as recited in claim 14 wherein each of the data stores receives data from a cache memory and wherein, at a time of a change in an operating mode data exists in the cache memory that has not been transferred to one of the data stores and wherein said apparatus additionally includes means for eliminating references to the transfers in the second data store and disregarding references to the transfers in the first data store.

18. Apparatus as recited in claim 11 wherein each of the data stores receives data from a cache memory and wherein, at a time of a change in an operating mode data exists in the cache memory that has not been transferred to one of the data stores and wherein said apparatus additionally includes means for eliminating references to the transfers in the second data store and disregarding references to the transfers in the first data store.

* * * * *